(No Model.) 2 Sheets—Sheet 1.
E. MORRISON & J. P. HERRON.
MACHINE FOR TESTING FABRICS.
No. 292,130. Patented Jan. 15, 1884.
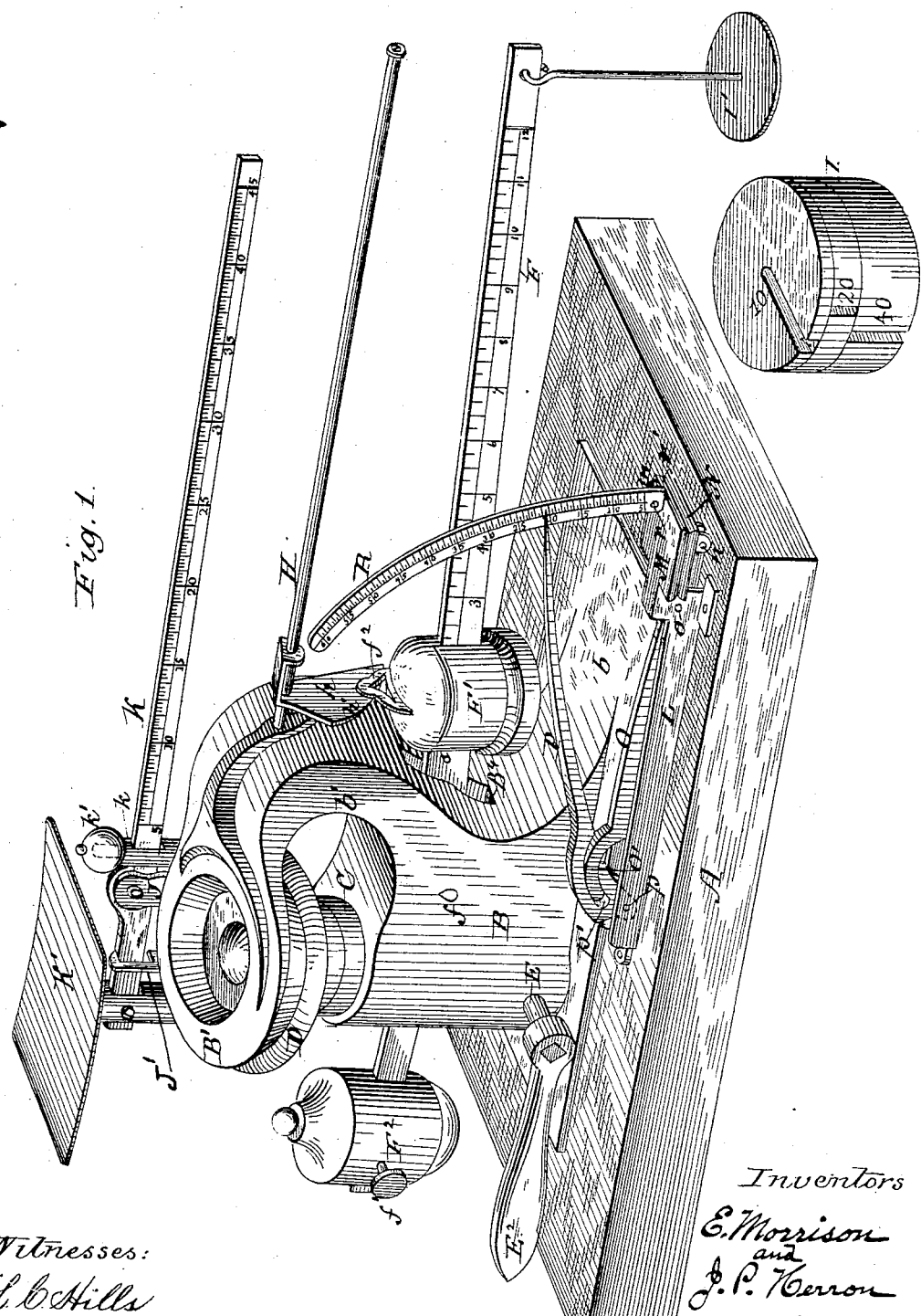
Witnesses:
L. C. Hills
Ja. Callahan
Inventors
E. Morrison
and
J. P. Herron
By E. B. Stocking
Atty.

(No Model.) 2 Sheets—Sheet 2.
E. MORRISON & J. P. HERRON.
MACHINE FOR TESTING FABRICS.
No. 292,130. Patented Jan. 15, 1884.
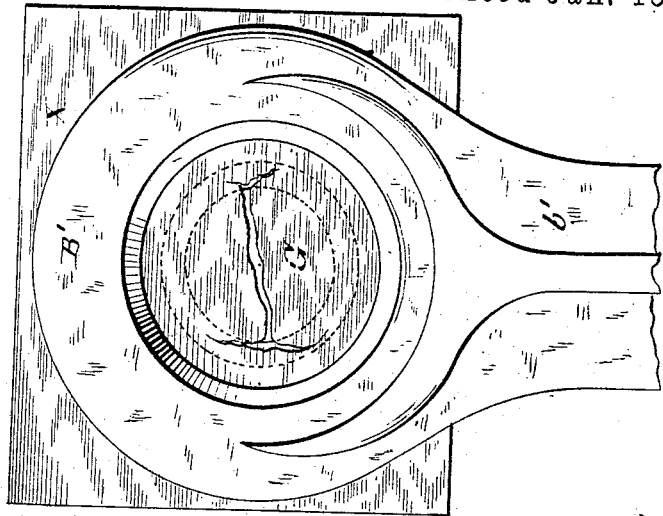
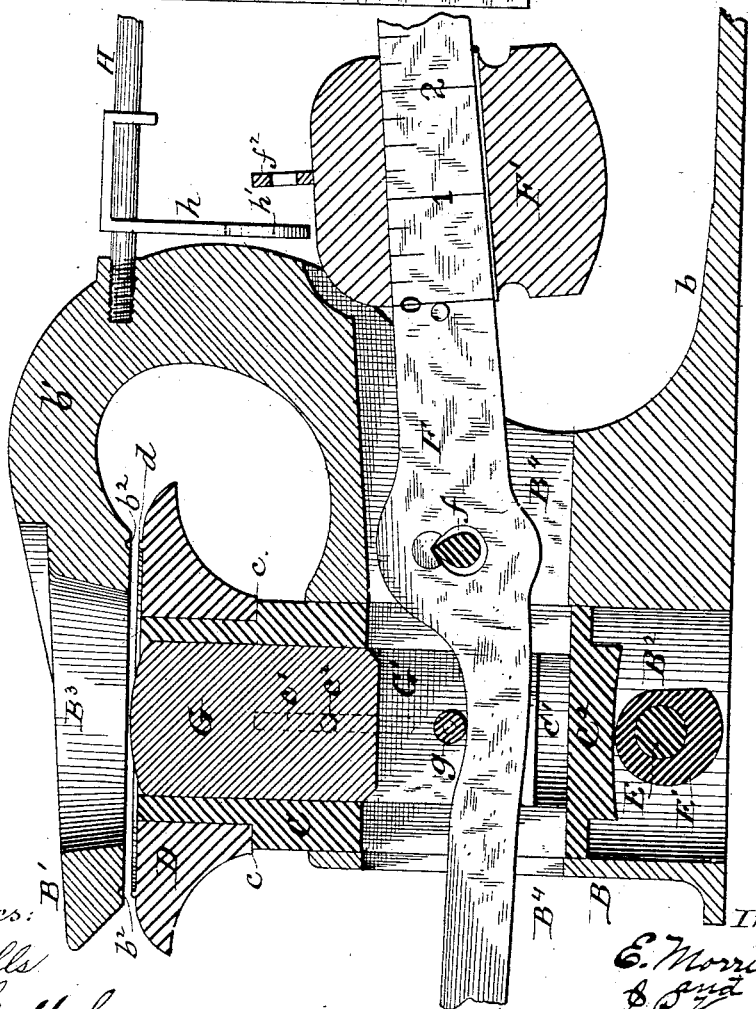

UNITED STATES PATENT OFFICE.

EBENEZER MORRISON AND JAMES P. HERRON, OF WASHINGTON, D. C.

MACHINE FOR TESTING FABRICS.

SPECIFICATION forming part of Letters Patent No. 292,180, dated January 15, 1884.

Application filed August 25, 1883. (No model.)

*To all whom it may concern:*

Be it known that we, EBENEZER MORRISON and JAMES P. HERRON, citizens of the United States, residing at Washington, in the District of Columbia, have invented a certain new and useful Method of and Means for Testing Fabrics, of which the following is a specification, reference being had therein to the accompanying drawings.

The object of this invention is to provide a method of testing fabrics which involves uniform and equal conditions, uniformity and equality in area or quantity tested, equal diffusion of strain in all directions throughout said area or quantity, and an unaffected unlimited freedom of breakage or rupture in any and all directions or lines within said area or quantity. By such a method regularity in results is secured, perfections or imperfections in the texture or make-up of the fabric are indicated, and a standard of excellence may be set up by which other fabrics of the same class may be rated.

Our method and our means may be used to test paper, cloth, leather, rubber, sheet metals, and any and all manufactured fabrics or natural tissues or substances, and we do not limit ourselves in its use or to the adaptation of our means to any particular use; but for the purpose of illustrating our invention we describe the application of our method and one form of means for its practice in connection with testing paper, or it may be any other substances having in general a sheet form; or, as is evident, ribbon, cord, or wire forms may be tested therewith.

Heretofore in testing fabrics it has been the practice to confine the ends of a strip of the same and subject said strip to longitudinal strain until it separates or breaks, and by a suitably-connected scale to indicate the strain in pounds. By such a method of procedure variations in the quantity or area subjected to test are liable to occur, and breakage can occur only on lines crossing the line of strain, and in case of variable thickness in or of tightness of the edges of the sample when clamped these alone determine the point of commencement of breakage, thus shielding or hiding defective spots within the area of the sample. The first essential step is, therefore, to determine with exactness the area of fabric to be tested, and to provide means whereby such area shall be the same in extent in all the samples or separate pieces of fabrics tested. The novelty of this step of our method consists in selecting and confining for test an area or portion of the fabric located wholly within its edges. By the use of this step in our method we avoid any lines of weakness which may possibly be produced at the edges in the act of cutting the sample or sheet to be tested, and determine the boundary of the area by an imaginary line which is wholly inside of the edges of the fabric. The outline, contour, or shape of such area may be as desired; but we prefer and have herein shown means for producing a disk-shaped or circular area, for in such an area a central point relative to its boundary exists, at which force may be applied so as to be diffused equally in all directions. The second feature of novelty in our method consists, therefore, in confining an area of a fabric wholly within its edges and applying pressure, force, or strain centrally.

So far as our step and method are concerned, we do not limit ourselves to any particular means whereby the same may be put to practical use, but deem any mechanism employed in the testing of fabrics which selects an inner area and applies force within the same as comprehended by our invention and an infringement of our rights. The contour or shape of the selected area may be square, triangular, diamond, or other shape, and the pressure, force, or strain may be applied at any point within or completely over and against the entire surface of said area, and this by mechanical devices or by fluid or air pressure. In this instance we have illustrated one means for applying our step and method to practical use.

Referring to the drawings, Figure 1 is a perspective of an apparatus constructed in accordance with our invention and adapted to practice our step and method of testing fabrics.

Fig. 2 is a nearly central vertical section of a portion of Fig. 1. Fig. 3 is a plan of a portion of said figure.

Like letters refer to like parts in all the figures.

On a suitable base, A, is secured a standard, B, the lower portion, b, of which is extended to give a broad surface of contact with or foundation upon the base A, and the upper portion of which is formed in a neck, b', and a head, B'. The standard B is bored vertically at $B^2$, and the head B' is also bored vertically at $B^3$, and substantially in line with the bore of the standard B. The standard is also slotted laterally and completely through, as shown at $B^4$.

Within the bore $B^2$ is fitted a cylinder, C, which is bored centrally and throughout its length, as at C', and provided with a plate bar or disk, $C^2$, closing its lower end. The upper end of the cylinder is reduced to form a shoulder, c, upon which is fitted a collar, D. The collar D is provided with an annular rib, d, and the head B' is provided with a groove, $b^2$, arranged to receive the rib d when the collar is raised against the head. A shaft, E, bearing a cam, E', and an operating lever or handle, $E^2$, is journaled in the standard at or near its lower end and across its bore, so that when the lever $E^2$ is turned to an upright position the cam acts against the plate $C^2$ and raises the cylinder and the collar thereon, so that the latter is forced firmly against the under surface of the head B'.

By the means thus far described it will be seen that when any fabric or sample thereof is inserted between the head and collar the same may be firmly clamped therein between, with all its edges projecting therefrom, (as clearly shown in Fig. 3,) and that an area is selected wholly within its edges, which area may be subjected to force, pressure, or strain for the purpose of testing the strength of the fabric at any and all points within the area so selected.

Without reference to further details of the mechanism herein shown, it is evident that by the usual well-known devices for producing fluid, steam, or air pressure, force may be exerted equally and completely over and against the one or the other surface of the circular area thus selected by making connection in any suitable manner with the bore of the cylinder C, or of the head B'. Such construction being a matter of mechanical skill only, further description thereof is omitted. Any ordinary pressure-gage used in connection with such fluid or air pressure devices, as usual, would indicate the amount of force required to fracture the fabric. In this instance we illustrate means whereby a scale-beam, F, is adapted to convey pressure to the fabric and to indicate the amount of pressure exerted thereon.

For this purpose a plunger, G, is fitted within the cylinder C, is slotted at G', and provided with a friction-roller, g, which rides upon the beam F back of its knife-edged pivot f, as clearly shown in Fig. 2. A slot, c', in the cylinder C, and a screw, $c^2$, passing therethrough and into the plunger, prevents the latter from rotating horizontally, and yet permits it to reciprocate vertically within the cylinder.

As thus far described, it will be seen that, the fabric being clamped as described, the weight F' may be moved out on the beam F until the plunger is forced against the under surface of the fabric and at the center of the selected area until the fabric X breaks, as shown in Fig. 3, at which instant said weight, by its position on the beam and by the scale of pounds thereon, will indicate the number of pounds pressure at which the fabric is or was ruptured.

The essential mechanical devices for the application of our novel step and method have now been hereinbefore described; but to secure further accuracy other features of construction are shown.

$F^2$ is a counter-balance, rendered adjustable along the rear extension of the beam F by means of its slotted body and its set-screw f', whereby the weight of the poise may be compensated. The weight F is provided with a projection, $f^2$, against which a depending plate, h, having a curved edge, h'', and supported on a rod, H, mounted in the neck of the standard and extended over the beam F, may be pressed in order to slide the weight along the beam without exerting thereon any downward pressure. By this means a more accurate weighing of the force exerted by the plunger upon the fabric is secured. Additional weights, I, are provided, which may be hung on the weight-pan I', to measure forces beyond the capacity of the beam F.

In testing fabrics from different sources, especially of different manufacturers, reliable tests require that the classes shall be uniform and the fabrics of the same grade; and hence the weight, for example, as in paper, per ream, and the thickness of the sample, should be considered. We therefore secure to the head B' pivot-standards J and a stop, J', of a paper-weighing scale, K, the beam of which is provided with the usual indicating-characters to show the weight, per ream, of a sheet thereof placed in the pan K'. The top k' of the sliding weight k is removable, and is used, as shown, in connection with a scale of heavier weights upon the opposite side of the beam K. (Not shown.)

Upon the base A, and adjacent to the standard B, is a thickness-gage, L, comprising a fixed jaw, M, and a movable jaw, N, arranged beneath the fixed jaw, and provided with one or more depending lugs, n, pivotally connected to a lever, O, pivoted at o in a rearward extension, M', of the fixed jaw M. The rear end of the lever O is curved, as at o', to snugly fit a similarly-curved slot, $p'$, formed in the index lever or pointer, P, pivoted at $p$ in said rearward extension of the fixed jaw M.

Pivotally secured to a lug, $m$, at the front end of the fixed jaw M, is a sector, R, bearing a scale of degrees, along which the pointer travels to greater or less distances, in accordance with the thickness of different samples or fabrics placed between the jaws of the gage, as shown at $x$, Fig. 5. By this instrument the thickness and consequently the ream-weight of the usual grades of paper may be ascertained, and by reason of the pivotal connection of the movable jaw with the lever O the jaw readily adjusts itself to the surface of the fabric being gaged. By reason of the single pivot $r$, by which the sector is connected with the fixed jaw, the sector may be folded down out of the way when using the beam F, and by reason of the projecting portion $r'$ of the sector it is prevented from being raised too high. In these details and all other matters which fall within the province of mechanical skill we do not limit ourselves, but may add to or omit the same, as special purposes or other reasons may require.

In practice we discover that our method enables us to find hidden defects in fabrics. A breakage will always follow the weakest lines of a structure, and instead of limiting our investigation to a single line of strain, as heretofore practiced, we develop the strain from a center, permitting its diffusion in all directions therefrom, so that, as it were, the force thus applied seeks out the lines of weakness and ruptures the fabric in or on those lines. The application of this principle is the purpose and accomplishment of our method, and is claimed by us, broadly, as of our invention, as hereinafter set forth, and any clamping devices arranged to select and hold for testing purposes an area of fabric wholly within its edges we deem the equivalent of our means herein shown.

It will be noted that by the use of our thickness-gage we are enabled to give the paper trade a uniform standard, by which all papers, from the lightest tissues to the heaviest boards, may be designated—as, for example, a "5° tissue," "20° manila." Furthermore, in regard to our means for testing fabrics, the thickness-gage may be used separately and independently of the weighing and testing devices, and may be for that reason detachably secured to the base A, or be entirely separate therefrom; and we do not therefore limit ourselves to its use in connection with said weighing and testing devices, but deem its construction, sale, or use separately as an infringement of our invention.

The means for testing herein shown is capable of use with strips, ribbons, or wire, as well as with sheets, in that the same may be clamped in such position that the plunger will act against the same, and such strips or ribbons may be tested with a single or a folded edge, as desired.

An advantage secured by our clamp is that the ribbon is held with equal firmness at both ends, and when centrally placed each edge is equally taut with the other—points not always secured in the means employed heretofore and at present in devices for giving longitudinal strain only.

The necessity of having uniform tightness in both edges of a strip or ribbon is apparent, as otherwise the entire force is concentrated and exerted at some point on the more tight edge, and thus a lower grade of strength is indicated by the sample than it is justly entitled to. The specific construction of the thickness-gage is not herein claimed, but is made the subject-matter of another application.

Having described our invention and its operation, what we claim is—

1. In the art of testing fabrics where the force applied is measured, the step herein set forth, which consists in confining an area wholly within the edges of the fabric, substantially as and for the purpose set forth.

2. The method herein set forth of testing fabrics, which consists in confining an area located wholly within the edges of the fabric, and applying pressure within said area, substantially as specified.

3. The method of testing fabrics which consists in confining a circular area of the fabric, applying pressure at the center of said area, breaking or rupturing the fabric, and indicating the amount of pressure, substantially as specified.

4. The method of testing fabrics which consists in rupturing or breaking the same at a confined portion only, and measuring the force employed, substantially as specified.

5. The combination of a rigidly clamping or confining mechanism, a plunger, and means for measuring the force applied to the plunger, substantially as specified, and for the purpose set forth.

6. In a machine for testing fabrics, an annular clamp, a concentric plunger, and a weighing apparatus connected with the plunger, substantially as and for the purpose set forth.

7. In a machine for testing fabrics, an annular clamp, comprising a head, as B′, and a collar, as D, a cylinder, as C, and means for operating the cylinder, substantially as specified.

8. The combination of the annular collar D, having the rib $d$, and the annular head B′, having the groove $b^2$, substantially as specified.

9. The combination of the annular head B′, the annular collar D, the cylinder C, and the plunger G, arranged concentric with each other, substantially as specified.

10. The combination of the plunger G, cylinder C, collar D, shaft E, cam E′, and lever E², with the standard B, provided with the annular head B', substantially as shown and described.

11. The combination of the standard B, bored and slotted as described, with the plunger G and scale F F' F², substantially as shown and described.

12. The standard B, bored and slotted as described, and provided with the pivot-standards J, substantially as shown and described.

13. The testing apparatus herein shown and described, comprising the pressure weighing scale F F' F², the scale K K', and the thickness-gage L, substantially as shown, and for the purpose specified.

In testimony whereof we affix our signatures in presence of two witnesses.

EBENEZER MORRISON.
JAMES P. HERRON.

Witnesses:
R. D. O. SMITH,
E. B. STOCKING.